United States Patent Office 3,743,702
Patented July 3, 1973

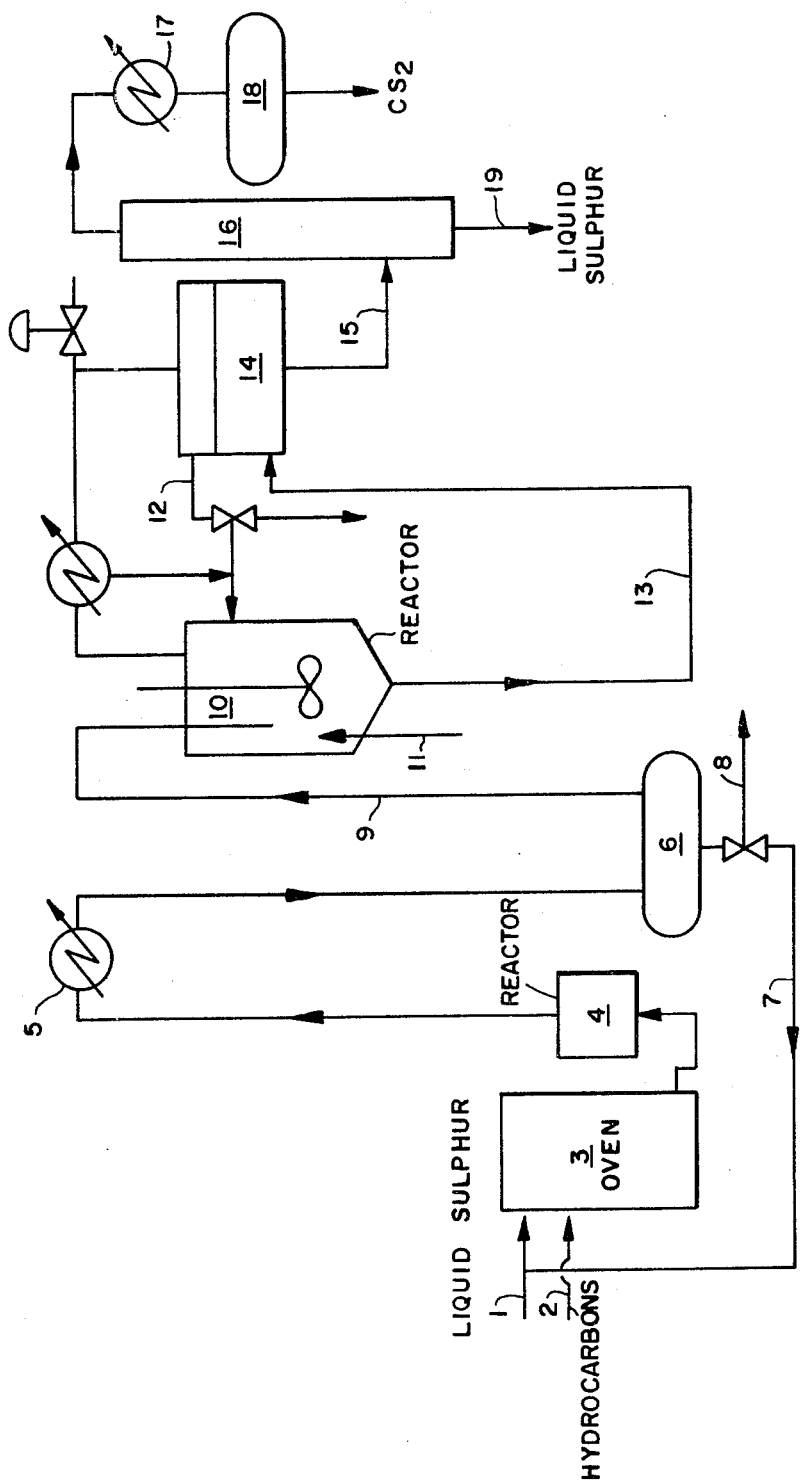

3,743,702
PROCESS FOR THE MANUFACTURE OF CARBON DISULPHIDE AND FOR THE RECOVERY OF SULPHUR
Francois Pierrot, 26 Rue Roussy, 69, Lyon 4eme, France, and Ghislain Schwachhofer, Chemin de Belmont, le Mas Rillier, 01 Miribel, France
Filed July 6, 1971, Ser. No. 159,735
Claims priority, application France, July 17, 1970, 7027686
Int. Cl. C01b *31/26*
U.S. Cl. 423—443                                   7 Claims

ABSTRACT OF THE DISCLOSURE

A process for the recovery of sulphur from a gaseous mixture of carbon disulphide and hydrogen sulphide by reacting the gaseous mixture with sulphur dioxide in the presence of water at a temperature below the melting point of sulphur and under pressure, and then separating the aqueous phase from the solution of sulphur in $CS_2$ and distilling off the $CS_2$ to isolate the sulphur.

The present invention relates to a process for the manufacture of carbon disulphide, and more particularly to the method of regeneration of the sulphur from the hydrogen sulphide by-product and the means of its recovery.

It is known that a gas mixture containing essentially carbon disulphide, hydrogen sulphide and the excess of sulphur initially employed, is obtained by the reaction of sulphur and certain hydrocarbons. In order to separate this mixture into its constituents, the procedure generally followed is first to condense the unconverted sulphur, by cooling the gases and, if appropriate, to condense a major proportion of the carbon disulphide, and then to subject the gas to an absorption process in suitable liquids, followed by desorption, so as to collect all of the carbon disulphide. The hydrogen sulphide, which now remains as the main gaseous constituent, is either burnt to produce sulphur dioxide, or treated to regenerate the sulphur, in accordance with the Claus process, which consists in the combustion of a part of the hydrogen sulphide, yielding $SO_2$, and a catalytic reaction of the latter with the residual $H_2S$, at a high temperature, to regenerate the sulphur.

Besides this general method, other methods of separation of such gaseous effluents containing carbon disulphide and of forming sulphur from hydrogen sulphide have already been proposed. A system has for example been described in U.S. Pat. 2,428,727 which consists in bringing the gaseous effluent, freed of the excess sulphur, into contact with sulphur dioxide and water so as to form sulphur from the hydrogen sulphide, while the carbon disulphide escapes as a gas and is subsequently condensed. According to this process, the reaction to form sulphur is generally carried out at normal pressure and under the conditions proposed the sulphur appears in the form of a colloidal suspension. Now it is known that these suspensions are very stable and that it is difficult to separate the sulphur from them; it is also known that the formation of sulphur in the colloidal state is accompanied by side-reactions leading to the formation of sulphuric acid and above all of polythionic acids, which reduce the yield; finally, it is known that colloidal sulphur is sparingly soluble in carbon disulphide. According to the above-mentioned process, it is also envisaged that the reaction shall be carried out at the melting point of the sulphur, that is to say at not less than 120° C., so as to recover the sulphur in the liquid state. In this case it is necessary to work at super-atmospheric pressure so that the water shall remain in the liquid phase. However, experiments carried out by the applicant have shown that this method of working was very difficult to put into practice in the presence of carbon disulphide, because it demanded precise control of the reaction conditions. Furthermore, the problem of the yield of sulphur remains completely. In summary, it thus appears, according to the prior art, that this method, which has the advantage of eliminating the $CS_2$ absorption-desorption operations and replacing the Claus process by an apparently simpler technique, is in reality difficult to put into practice and cannot give satisfactory results.

A means has now been found of reacting a gaseous mixture of carbon disulphide and hydrogen sulphide with sulphur dioxide in the presence of water and of recovering the sulphur formed from $H_2S$ in the liquid form, in practically quantitative yield, under reaction conditions which are simple and very flexible and hence easily adaptable to the various techniques of manufacture of carbon disulphide. Other advantages of the process will appear during the description below.

In its most general form, the subject of the present invention is a process for the manufacture of carbon disulphide and recovery of sulphur from the hydrogen sulphide, which comprises reacting sulphur vapor with hydrocarbons under conditions which lead to the formation of a gaseous mixture containing carbon disulphide and hydrogen sulphide, optionally condensing the unconverted sulphur and/or a part of the carbon disulphide, bringing the remaining gas mixture into contact with sulphur dioxide in a molar ratio of $H_2S/SO_2$ at least equal to the stoichiometric ratio, that is to say 2/1, in the presence of water, at a temperature below the melting point of sulphur and under a pressure at least sufficient for the carbon disulphide to condense practically completely, so that sulphur which dissolves in carbon disulphide is obtained by reaction of $SO_2$ with $H_2S$, and finally separating the aqueous phase and the solution of sulphur in carbon disulphide, and isolating the sulphur by distillation of the carbon disulphide.

The mixture containing carbon disulphide and hydrogen sulphide can be produced according to any of the previously known techniques wherein an hydrocarbon feed, generally aliphatic saturated or unsaturated hydrocarbons, is reacted with sulphur at temperatures from 450 to 1,000° C. with or without catalysts. In particular, the mixture containing carbon disulphide can be manufactured by applying the methods described in U.S. Pat. No. 3,436,181 granted Apr. 1, 1969, which claims a process which employs olefines and/or diolefines, or in British Pat. No. 1,173,344 filed June 8, 1967, which relates to the use of propane, or finally in U.S. application Ser. No. 808,598 filed Mar. 19, 1969, which discloses a specific method of injection of the hydrocarbons into the reaction zone, it being possible for these hydrocarbons to be either olefines and/or diolefines alone, or a combination of these with saturated aliphatic hydrocarbons, especially methane.

Since all the known techniques which have just been referred to generally use an excess of sulphur, the process according to the invention in the majority of cases continues with condensation of the excess sulphur. This operation is carried out by passing the gaseous effluent into a condenser where the mixture is cooled to a temperature of 120–150° C., which yields a liquid sulphur of low viscosity, which is collected in a trough. In the present case, it is not necessary to remove the sulphur completely by means of the series of costly and delicate operations which are well known to those skilled in the art, because the small amounts of sulphur which can still be present in the gas mixture after the above-mentioned condensation are wholly recovered in the subsequent stages of the method according to the invention.

Thereafter, the reaction to form sulphur is carried out by bringing the gas mixture into contact with sulphur dioxide in the presence of water, while applying the conditions according to the invention.

The conditions of temperature and pressure, which are each a function of the other, can be chosen within wide limits, which makes the process very flexible and this constitutes a further advantage thereof. The pressure must be increased at the same time as the temperature so that the reaction mixture always contains liquid phases of water and of carbon disulphide. In general terms it can be said that to achieve almost complete condensation of the carbon disulphide, the total pressure must be at least equal to the vapor pressure of the carbon disulphide under the selected temperature conditions and sulphur concentration conditions. There is no upper limit, but as the process gives excellent results at moderate pressures, it is advantageous, for obvious technological reasons, to restrict the process to rather low values. A convenient method consists of choosing a pressure which, apart from the pressure losses, is identical to that applied in the stage of preparation of the gaseous mixture of carbon disulphide and hydrogen sulphide; however, it is always possible to employ a different pressure, and it is furthermore essential to apply excess pressure if the preparation stage is carried out under normal pressure. The upper limit of temperature is that of the melting point of the sulphur, that is to say about 120° C. There is no really critical lower value; however, in order to achieve a sufficient reaction speed, it is preferable not to go below 50° C. Within these general possibilities, it has been found that the most advantageous temperature range is between about 60 and 100° C., with corresponding minimum absolute pressures between 1.5 and 5.5 bars absolute.

The molar ratio of the hydrogen sulphide to the sulphur dioxide is at least equal to the stoichiometric ratio, that is to say to 2 mols of hydrogen sulphide per 1 mol of sulphur dioxide; the use of a slight excess of $H_2S$, of the order of a few percent (in mols) is not excluded.

The content of carbon disulphide in the gas mixture brought into contact with the sulphur dioxide does not have a special effect on the course of the reaction which forms sulphur, and can be any desired proportion of this mixture. It is possible to lower this proportion deliberately by prior condensation of a part of the $CS_2$ initially present; however, care must be taken that the carbon disulphide content should be sufficient that during the formation of the sulphur, the latter can be dissolved completely, taking into account the reaction temperature.

The sulphur dioxide is employed either in the pure gaseous or liquid state, or in the form of an aqueous solution; in the latter case, the $SO_2$ concentration of the solution can be equivalent to saturation or can correspond to a greater dilution. This solution thus provides the process simultaneously with $SO_2$ and with all or part of the water required. The sulphur dioxide can originate from any desired source; it can optionally be produced wholly or partly by combustion of the excess sulphur previously separated from the initial gas mixture containing hydrogen sulphide and carbon disulphide.

The total water content of the medium is not critical and can vary within wide limits; it is chosen as a function of the practical details of carrying out the process.

At the end of the reaction of sulphur formation, the reaction mixture passes into a quiet zone where the aqueous phase and the sulphur solution rapidly separate by simple decantation. This easy decantation of the two liquid phases is characteristic of the absence of colloidal sulphur, the formation of which is avoided by virtue of the conditions which form the subject of the invention. The sulphur solution is withdrawn and passed into a distillation apparatus which can be operated under normal pressure or under a higher pressure. The carbon disulphide passes over at the head and is then condensed, while the liquid sulphur is withdrawn from the sump from where it can be recycled directly to the stage of manufacture of carbon disulphide and hydrogen sulphide by reaction with hydrocarbons. The carbon disulphide collected generally does not contain more than 0.15 to 0.30% of hydrogen sulphide.

Using the conditions of the invention, the reaction between the hydrogen sulphide and the sulphur dioxide is very rapid and a 100% conversion rate to sulphur, relative to $SO_2$, is achieved. The sulphur dissolves practically completely in the carbon disulphide, giving a homogeneous solution. The separation of this solution into its constituents, which takes place by simple distillation, does not present any particular problem. The aqueous phase collected after the process is limpid and only contains a few hundred parts per million of total sulphur; furthermore, it is surprising to find that its pH is within a relatively high range, in particular between 3 and 5; this clearly shows the selective character of the reaction of formation of sulphur, and the absence of acid compounds originating from side-reactions, in particular the absence of sulphuric acid and of polythionic acids. This water can be re-used as it is in the zone where the sulphur is formed, without an intermediate treatment. It can be employed for the preparation of the aqueous solution of sulphur dioxide if the latter is introduced in this form into the zone where the sulphur is formed.

In practice the process according to the invention can be carried out in various ways, discontinuously and, more generally, continuously. It will be better understood by referring to the schematic representation of the attached drawing which illustrates, without implying a limitation, an embodiment of the process according to the invention. Liquid sulphur is introduced through the pipeline 1 into the coil of the oven 3, where it is vaporized, and hydrocarbons are introduced through the pipeline 2; the gases circulate and react in the oven and then in the reactor 4. On issuing from this first reaction zone, the gas mixture passes into the condenser 5, where it is freed of sulphur, which is collected in the trough 6; the sulphur thus recovered is recycled through the pipeline 7 to the oven 3, or is passed, wholly or partly, through 8, to a combustion apparatus (not shown in the schematic representation) for the preparation of sulphur dioxide. The remaining gases, consisting principally of hydrogen sulphide and carbon disulphite—the pressure of which has optionally been changed so as to bring it to the desired value for the subsequent stage—are passed through the pipeline 8 into the reactor 10 for the formation of sulphur. The reactor 10 is equipped with a stirrer. The gaseous sulphur dioxide is introduced through the line 11. The water is fed in by means of the pipeline 12, equipped with a take-off pipeline to remove the water formed during the reaction. At the bottom of the reactor 10, the reaction mixture flows out through the pipeline 13 and passes into the decanter 14. The upper aqueous phase constitutes the source of supply of water for the reactor 10. The lower layer which decants in the apparatus 14 and consists of the solution of sulphur in carbon disulphide is passed through the pipline 15 into the distillation apparatus 16. The carbon disulphide distills and is condensed in 17 in order to be collected in the through 18, while the liquid sulphur is withdrawn through the pipeline 19. A line for the control of the pressure on the gas vent, connected to the reactor 10 and to the decanter 14, is provided, with the condensable products being recycled to the reactor 10.

The apparatus thus described can be modified as a function of the various variants within the present invention. Thus, if it is desired to decrease the carbon disulphide content of the reaction mixture produced by the reaction of the sulphur with the hydrocarbons, a condenser for the carbon disulphide will be provided in line 9. Furthermore, if sulphur dioxide in the form of an aqueous solution is introduced into the reactor 10, it is possible to add to the apparatus an absorption tower fed, at its bottom, with gaseous sulphur dioxide or with a gas containing this reagent, and fed at its upper part with water, which can be the aqeuous phase originating from the decanter 14. The sulphur dioxide solution formed is passed into the reactor 10, and thus provides the reaction zone with water and with $SO_2$. If the process is carried out discontinuously, the decanter 14 can be omitted and the decantation allowed to take place in the device 10, after stopping the gas feed. Also, it is possible, in the reaction zone between the sulphur and the hydrocarbons, to replace the reactor 4 by a series of two or more reactors, or conversely to omit these completely, the reaction then being effected solely in the coil of the oven.

Of course, any other device which is known or within the ability of those skilled in the art can be substituted wholly or partly for the apparatus described above without going outside the scope of the present invention.

The examples which follow and are given without implying a limitation, illustrate the subject of the invention.

EXAMPLE 1

This example illustrates a discontinuous operation in which sulphur dioxide in the gaseous state is introduced.

Propylene was reacted with sulphur vapor, after which the excess sulphur was condensed and a gas mixture containing 68% by weight of $CS_2$ and 32% by weight of $H_2S$ was obtained. On the one hand, 1815 g. of this mixture, and on the other, 3.33 mols/hour of practically pure sulphur dioxide (molar ration $H_2S/SO_3=2.02$), were introduced into a reactor previously charged with 2.81 of water over the course of 2 hours 30 minutes. The reactor operated at 75° C. under an absolute pressure of 3 bars. After stopping the introduction of the gases, and after decantation, 2020 g. of a solution of sulphur in carbon disulphide were withdrawn and distilled under atmospheric pressure at a temperature of 125° C. in the boiler The carbon disulphide was collected at the head and 795 g. of liquid sulphur were withdrawn at the base of the column.

The aqueous phase, weighing 3120 g., had a pH of 5.1 and apart from the dissolved $H_2S$ contained 180 parts per million (p.p.m.) of total sulphur. It was re-used, as obtained, in a subsequent operation.

EXAMPLE 2

The experiment of Example 1 was repeated, this time first preparing a gas mixture containing 69% of $CS_2$ and 31% of $H_2S$, and then introducing this mixture and sulphur dixodie into the reactor for the formation of sulphur, at identical flow rates to those of Example 1, but working at 93° C. under 4.5 bars absolute pressure. After stopping the reaction, and after decantation, the solution of sulphur in carbon disulphide was distilled under atomospheric pressure. 1180 g. of $CS_2$ and 816 g. of liquid sulphur were collected.

The aqueous phase had a pH of 3.9 and contained 168 p.p.m. of total sulphur after removing the dissolved $H_2S$ as a gas.

EXAMPLE 3

A mixture of 35.4% of carbon disulphide and 64.6% of hydrogen sulphide was prepared by reacting a charge of hydrocarbon and sulphur vapor and then condensing the excess sulphur and a part of the carbon disulphide formed.

1470 g. of this mixture and 13.5 mols of gaseous sulphur dioxide were introduced over a period of 4 hours into a reactor initially charged with 2800 g. of water recycled from a preceding experiment, the reactor operating at 85° C. under 4.5 bars absolute pressure. After decantation, the lower layer was distilled and 508 g. of $CS_2$ and 1296 g. of liquid sulphur were collected.

The aqueous phase had a pH of 4.9 and was free of $SO_2$; after removing the dissolved $H_2S$, representing 580 p.p.m., it only contained 146 p.p.m. of total sulphur, corresponding to a yield of 99.9% of sulphur isolated.

In continuous operation, the recycling of the water charged with $H_2S$ directly to the reactor for the formation of sulphur, after removing the water formed by the reaction, does not present any difficulty.

EXAMPLE 4

In an apparatus of the type shown schematically in FIG. 1, the coil of the oven 3 was fed continuously with 22.3 kg./hour of a hydrocarbon charge and 175 kg./hour of sulphur. The reaction was carried out at 685° C. under an effective pressure of 3 bars. The excess sulphur employed was recovered in the trough 6 and recycled to the reaction. The gas mixture which remained and contained 62.5% by weight of $CS_2$ and 37.5% of $H_2S$ was introduced, at a rate of 184 kg./hour, into the reactor 10, which had a capacity of 2 m.³. The reactor also received an aqueous solution of sulphur dioxide of concentration 25 g./l., at a flow rate of 2.56 m.³/hour. In this apparatus, the temperature was 75° C., the effective pressure 2 bars, and the dwell time 45 minutes. The sulphur dioxide reacted completely. In the distillation column 16, which operated under atmospheric pressure, the sump temperature was 130° C.

After 20 hours' running, a total of 1919 kg. of liquid sulphur were withdrawn through the pipeline 19. 2274 kg. of $CS_2$ containing 0.15% of hydrogen sulphide were collected in the trough 18, and it was possible to remove the hydrogen sulphide easily by any conventional means, such as a neutralization.

It will be obvious to those skilled in the art that various changes may be made without departing from the spirit of the invention and therefore the invention is not limited to what is shown in the drawings and described in the specification, but only as indicated in the appended claims.

What is claimed is:

1. In a process for the manufacture of carbon disulphide by reaction of hydrocarbons with sulphur and recovery of sulphur from the hydrogen sulphide by-product by bringing the latter into contact with sulphur dioxide, which comprises reacting sulphur vapor with hydrocarbons under conditions leading to the formation of a gas mixture containing carbon disulphide and hydrogen sulphide, and optionally condensing the unconverted sulphur and/or a part of the carbon disulphide, the improvement comprising bringing the remaining gas mixture into contact with sulphur dioxide in a molar ratio $H_2S/SO_2$ at least equal to the stoichiometric ratio, in the presence of water, at a temperature below the melting point of the sulphur and under a pressure at least sufficient for the carbon disulphide to be condensed practically completely, so that the sulphur which is obtained by the reaction of $SO_2$ with $H_2S$ dissolves in the carbon disulphide, and finally separating the aqueous phase from the solution of sulphur in carbon disulphide and isolating the sulphur by distillation of the carbon disulphide.

2. A process according to claim 1 wherein the reaction between the said remaining gas mixture and the sulphur dioxide is carried out at a temperature of between 60 and 100° C. under a corresponding minimum absolute pressure of between 1.5 and 5.5 bars absolute.

3. A process according to claim 1, wherein the sulphur dioxide is used in the pure, gaseous or liquid state.

4. A process according to claim 1, wherein the sulphur dioxide is used in the form of an aqueous solution.

5. A process according to claim 1, wherein said aqueous phase is recycled to the zone where the sulphur is formed.

6. A process according to claim 4, wherein said aqueous phase is used to prepare the aqueous solution of sulphur dioxide.

7. A process according to claim 1, wherein the sulphur dioxide is produced by the combustion of the excess sulphur condensed from the said gas mixture.

References Cited
UNITED STATES PATENTS

| | | | |
|---|---|---|---|
| 1,765,809 | 6/1930 | Vogel | 23—206 |
| 2,428,727 | 10/1947 | Thacker | 23—206 |
| 2,666,690 | 1/1954 | Folkins et al. | 23—206 |
| 3,079,233 | 2/1963 | Wenzke | 23—206 X |
| 3,250,595 | 5/1966 | Olsen | 23—206 X |

GEORGE O. PETERS, Primary Examiner

U.S. Cl. X.R.

423—575

UNITED STATES PATENT OFFICE
CERTIFICATE OF CORRECTION

Patent No. 3,743,702      Dated July 3, 1973

Inventor(s) F. PIERRET et al.

It is certified that error appears in the above-identified patent and that said Letters Patent are hereby corrected as shown below:

Column 5, line 1, delete "through" and insert -- trough --;

line 44, delete "$H_2S/SO_3$" and insert -- $H_2S/SO_2$ --.

Signed and sealed this 27th day of November 1973.

(SEAL)
Attest:

EDWARD M. FLETCHER, JR.
Attesting Officer

RENE D. TEGTMEYER
Acting Commissioner of Patents